United States Patent
Lorge (10) Patent No.: US 9,373,081 B2
(45) Date of Patent: *Jun. 21, 2016

(54) ALERT MANAGEMENT SYSTEM AND METHOD

(71) Applicant: International Business Machines Corporation, Armonk, NY (US)

(72) Inventor: Freddy Lorge, Vedrin (BE)

(73) Assignee: International Business Machines Corporation, Armonk, NY (US)

(*) Notice: Subject to any disclaimer, the term of this patent is extended or adjusted under 35 U.S.C. 154(b) by 622 days.

This patent is subject to a terminal disclaimer.

(21) Appl. No.: 13/789,827

(22) Filed: Mar. 8, 2013

(65) Prior Publication Data

US 2013/0185243 A1    Jul. 18, 2013

Related U.S. Application Data

(63) Continuation of application No. 13/442,978, filed on Apr. 10, 2012, now Pat. No. 8,468,114, and a continuation of application No. 12/330,876, filed on Dec. 9, 2008, now Pat. No. 8,200,606.

(30) Foreign Application Priority Data

Feb. 18, 2008  (FR) ..................... 08101713

(51) Int. Cl.
*G06F 17/00* (2006.01)
*G06N 5/02* (2006.01)
*G06N 5/04* (2006.01)

(52) U.S. Cl.
CPC ............ *G06N 5/025* (2013.01); *G06N 5/02* (2013.01); *G06N 5/04* (2013.01)

(58) Field of Classification Search
None
See application file for complete search history.

(56) References Cited

U.S. PATENT DOCUMENTS

| | | | |
|---|---|---|---|
| 4,903,215 A * | 2/1990 | Masuishi | G06N 5/046 706/47 |
| 6,618,716 B1 | 9/2003 | Horvitz | |
| 6,742,141 B1 | 5/2004 | Miller | |
| 7,694,115 B1 * | 4/2010 | Porras | H01L 12/2602 709/224 |
| 2004/0102928 A1 | 5/2004 | Cuddihy et al. | |
| 2004/0193462 A1 | 9/2004 | Beasley | |
| 2005/0138494 A1 | 6/2005 | Njo et al. | |
| 2006/0025985 A1 | 2/2006 | Vinberg et al. | |
| 2006/0143034 A1 | 6/2006 | Rothermel et al. | |
| 2006/0161816 A1 | 7/2006 | Gula et al. | |

OTHER PUBLICATIONS

Office Action (Mail date Oct. 12, 2011) for U.S. Appl. No. 12/330,876, filed Dec. 9, 2008.
Nov. 29, 2011 Filed Response to Office Action (Mail date Oct. 12, 2011) for U.S. Appl. No. 12/330,876, filed Dec. 9, 2008.

(Continued)

*Primary Examiner* — Luis Sitiriche
(74) *Attorney, Agent, or Firm* — Maeve M. Carpenter (57) ABSTRACT

A system and related method for automating alert decision-making in a computer network are disclosed. The system and method act to receive an alert request from an event management system, and then carries out operations using several sets of inference rules, associating the alert request to a generic conceptual data model of alert request and alert resolution. The generic model is specialized to represent the specific environment being monitored. The alert request is enriched with contextual and network information in order to generate one or several alert resolution actions.

15 Claims, 4 Drawing Sheets

(56) References Cited

OTHER PUBLICATIONS

Notice of Allowance and Fee(s) Due (Mail date Feb. 7, 2012) for U.S. Appl. No. 12/330,876, filed Dec. 9, 2008.
Office Action (Mail date May 9, 2012) for U.S. Appl. No. 13/442,978, filed Apr. 10, 2012.
Jun. 8, 2012 Filed Response to Office Action (Mail date May 9, 2012) for U.S. Appl. No. 13/442,978, filed Apr. 10, 2012.
Final Office Action (Mail date Sep. 14, 2012) for U.S. Appl. No. 13/442,978, filed Apr. 10, 2012.
Sep. 27, 2012 Filed Amend. After Final with RCE to Final Off. Act. (Mail dt. Sep. 14, 2012) for U.S. Appl. No. 13/442,978, filed Apr. 10, 2012.
Notice of Allowance and Fee(s) Due (Mail date Nov. 23, 2012) for U.S. Appl. No. 13/442,978, filed Apr. 10, 2012.
Jan. 9, 2013 Filed RCE with Supplemental Information Statement and PTO/SB/08a for U.S. Appl. No. 13/442,978, filed Apr. 10, 2012.
2nd Notice of Allowance and Fee(s) Due (Mail date Feb. 13, 2013) for U.S. Appl. No. 13/442,978, filed Apr. 10, 2012.

\* cited by examiner

ALERT MANAGEMENT SYSTEM AND METHOD

The present application is a continuation application of a U.S. patent application Ser. No. 13/442,978, filed Apr. 10, 2012, allowed Feb. 13, 2013, which application is a continuation application of application Ser. No. 12/330,876, filed Dec. 9, 2008, allowed Feb. 7, 2012 and issued as U.S. Pat. No. 8,200,606.

BACKGROUND OF THE INVENTION

1. Field of the Invention

The present invention relates generally to expert systems and knowledge management and, more particularly, to systems and methods for assisting an operator where real-time support and automatic decision-making may be required.

2. Background and Related Art

It is known in the art that an expert system is a computer program intended to embody the knowledge and the ability of a human expert in a certain domain.

The objective of an expert system is to resolve a problem or give advice to resolve it. It can be, for instance, a system to answer a question from a non-expert user, or to react to an event. Generally, an expert system requires knowledge and data. Knowledge contains a set of rules that act upon data to accomplish the objectives of the system. Data represents facts and information concerning the specific domain for which the expert system runs. When reacting to an event, an expert system must respond reliably and quickly to treat the ongoing situation. This is particularly true when situations are continually changing. The expert system detects the event and determines the applicable actions in accordance to the class of the event and/or the circumstance in which the event appears. Then, the expert system evaluates the effects of its selected action and quickly initiates the event response mechanisms accordingly. Actual expert systems provide a solution to respond to a specific circumstance if the scenario exists. The computer normally applies heuristics and rules in a knowledge-specific domain to render advice or make recommendations, much like a human expert would. Expert systems have managed to achieve fairly a high level of performance in task areas that require a good deal of specialized knowledge and training. Often they perform tasks that are complex, tedious, or expensive to have a non-expert human perform.

Event Management Systems used to monitor and manage data centers work like "event expert systems", specialized in the management of data center events. They receive events that they must analyze and to which they must react according to rules. To work effectively, they have their own representation of the environments they must monitor, through a data model like the one provided by the standard Common Information Model (CIM), describing the detailed information needed to monitor systems, networks and applications.

The Common Information Model (CIM) is an open standard that defines how managed elements in an Information Technology (IT) environment are represented as a common set of objects and relationships between them.

However, present event expert systems only manage events for which proven solutions exist and do not permit convenient management of an unexpected or unknown event (i.e. one that occurs for a first time) and/or recurrent events reappearing after event screening. The detection of such unresolved events triggers alerts to the operator console. In that sense, an alert is an event that could not be resolved by the event expert system.

Managing alerts differ from managing an event. Data models, such as the one provided by CIM for IT environments, are useless to IT operators in managing alerts. IT operators have, indeed, their own representation of the environment being monitored, made of other concepts. For instance, IT operators usually don't handle detailed technical information like IP addresses, but use rather the name of the application and the customer to identify the resolution action to be taken. IT operators, therefore, need a certain degree of common sense to interpret the information carried by the alert, to identify it unambiguously and finally, to make the correct decision. Failure to monitor addressing alerts can jeopardize system performance and management of the environment, particularly when monitoring data centers. The purpose of a data center is to host and run applications that handle the business (be it a core or a secondary business) and data of the organization, like operational data and/or decisional data and/or transient and/or audit data and so on.

Generally, a data center contains a set of servers, storage, firewalls, routers and switches that transport traffic between the servers and to/from the outside world. Some of the applications are composed of multiple components (like file servers, application servers, database servers and the like) running on multiple hosts. Some applications also make use of several infrastructure servers (e.g., LDAP, mail relays, load balancers). A complex modern data center hosts infrastructures made of shared, clustered and/or virtualized systems running multiple applications (such as ERP packages) and subsystems (such as database instances or transactions managers) for multiple customers, geographically dispersed, supported by multiple teams of systems engineers. In such an environment, subsystems do not always run on the same dedicated host, and every subsystem could serve several applications for several customers. Operators have to deal with this challenging complexity when analyzing and handling alerts issued from data centers.

Normally, when a recognized event occurs, the event expert system (e.g., an Event Management System monitoring the data center) manages it at the system level only, without interaction with the rest of the environment.

Unlike events, alerts need a human intervention. When the event expert system triggers an alert to the operator console, the alert is interpreted out of the system level by the operator, and is handled by some appropriate recovery actions.

The recovery actions consist in editing any of the alert messages before implementing a solution and cancelling them all, if necessary. To achieve this, the operator uses console procedures.

The operator starts certain tasks to recover the alert error by applying some recovery concepts provided from an operator step-by-step guide or the operator involves the assistance of a predefined set of decisions described in the guide emphasizing the actions to be run. Those skilled in the art will perceive numerous action support for assisting the operator all along the recovery process task.

Depending on the complexity of the data center, various different alert errors can potentially appear simultaneously, some of them can be unknown to the operator and/or not clearly indexed when searching an adequate solution in the operating manual. In addition, the alert message and the solution provided by the operating manual may be subject to interpretation that represents a risk about the solution assessment. Moreover, the adopted solutions may be subject to uncertainty about the underlying alert error that the operator tries to examine, since some of them may be obsolete because of new technology systems. Thus, it may be impossible to respond rapidly to the alert error and the action attempted may no longer be relevant.

To summarize, the aforementioned methods present several drawbacks. For example:

The information carried by alerts issued from an Event Management System does not match the concepts used by operator's reasoning.

Existing alert recovery makes difficult the process of finding out what the problem is and what to do about it.

Existing operating manuals present a risk about the identification of an alert and the solution assessment when used in a complex data center.

The solution presented by the operating manual may be obsolete when an unknown alert error is generated. The operating manual contains documentation to help identify an alert (such as, for example, the DB instance 'xx' on the IP address 'zz' runs for the customer 'cc'). When a system arrangement moves from one configuration to another one, the operating manual may become quickly obsolete and thus does not reflect the organization changes. Thus, a well known alert may be transformed into an unknown alert that needs to be handled.

The action attempted is often no longer relevant in a case of paramount necessity and emergency.

There is no adequate assistance given to the operator when multiple alert errors appear simultaneously that slow down the process of identifying the alert, finding the solution procedure, and applying the solution.

These drawbacks are made worse in a virtualized environment, where the resources are shared among several applications and customers, thereby making the data center more complex to manage and monitor.

The present invention offers solutions to solve the aforementioned problems. Such solutions will be more apparent in the following description.

SUMMARY OF THE PRESENT INVENTION

Accordingly, a first object of the present invention is to provide a system and a method for assisting an operator, particularly where challenging real-time automatic decision-making is required.

It is a second object of the present invention to provide step-by-step methods and techniques for the automatic handling of addressing alerts issued from a system in order to manage the resources belonging to a complex data center.

It is a further object of the present invention to identify, unambiguously, alerts and take the appropriate actions using a generic data model representing the information and concepts needed by various kind of operators. It targets operators like system watchers and/or help desks and/or inexperienced system administrators and/or in general, any non-expert users not knowledgeable in the systems being monitored. The invention described herein is intended for operators as defined above.

Another object of the present invention to automate decision-making and actions of an operator by using a conceptual generic data model representing all information that an operator (or any replacing tool) must have.

It is also an object of the present invention to assist the operator in editing alert messages without ambiguity using a conceptual generic data model.

Likewise, it is an object of the present invention to provide the operator with some knowledge management features, when alert handling cannot be automated.

Yet another object of the present invention is to offer the ability to implement a specialized version of the generic data model that fits with a specific data center implementation.

A further object of the present invention is to provide a system having the ability to automatically derive the specialized version of the generic data model adapted to a specific data center.

According one embodiment of the invention, there is provided a method for controlling the decision-making of an operator, the method comprising the steps of:

implementing a generic conceptual data model into an expert system;

automatically adding constrains on the generic data model to make it a specialized model adapted to a specific data center environment;

enriching information carried by alerts; and automating the actions of the operator.

Therefore, it is an object of the present invention to analyze automatically the environment that needs to be monitored, and to define a framework for intelligent alert management that is autonomous, self-adaptive and portable across data centers.

Finally, it is an object of the invention to offer a system and method adaptable to any existing and running Event Expert System (those expert systems that do system management and monitoring in data centers) without having to redefine or rewrite the system configuration.

According to the invention, there is provided a method, system and program storage device as further described in the appended independent claims. Particularly, a method for automating alert decision-making in a computer network is disclosed. The method comprises the steps of:

receiving an alert request;

associating the received alert request to a generic conceptual data model of alert request and alert resolution and using a set of inference rules to construct a personalized model related to the computer network being monitored;

using another set of inference rules to generate information identifying the received alert as an instance of said personalized model; and using a further set of inference rules to enrich the identified alert with at least contextual information relevant to an operator, including at least identification of the components in said computer network that are impacted by the alert.

The method further comprises the step of using a set of inference rules to enrich the identified alert with at least a target service level for said components and at least a list of resolution actions.

The method comprises the further steps of using historical statistics data to identify the past behavior of said components and combining the enriched alert and identified past behavior of said components to generate at least one alert resolution action.

Further embodiments are described in the appended dependent claims.

Further aspects of the invention will now be described, by way of preferred implementation and examples.

BRIEF DESCRIPTION OF THE DRAWINGS

The above and other items, features and advantages of the invention will be better understood by reading the following more particular description of the invention in conjunction with the accompanying drawings wherein.

DETAILED DESCRIPTION OF THE INVENTION

Embodiments of the invention as described hereinafter by way of examples with reference to the accompanying figures.

More specifically, according to a first aspect, the present invention consists in a decision-making system, named Alert Decision-Maker, and a method for assisting an operator when confronting an addressing alert in real-time.

Figure 1:
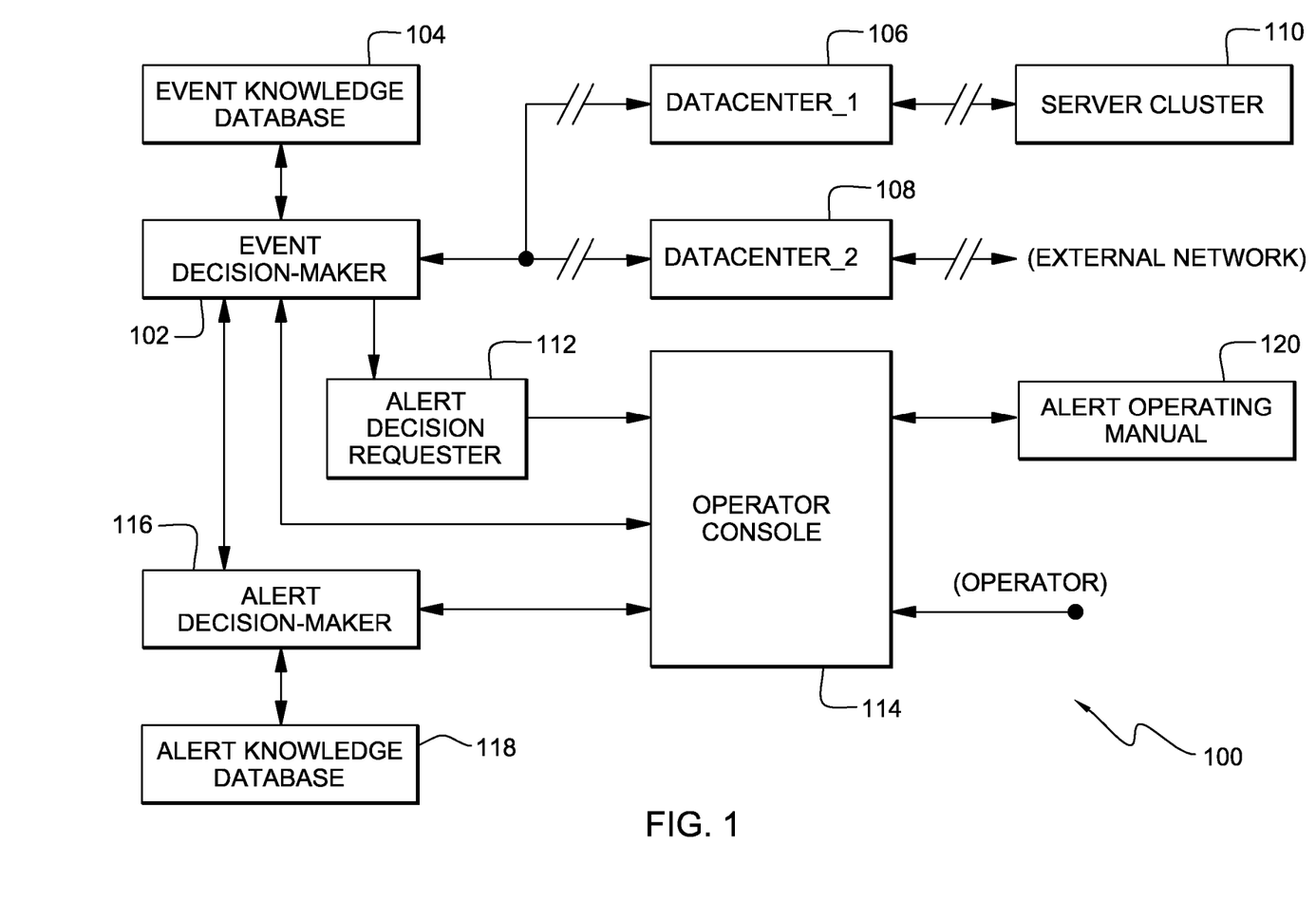
FIG. 1 shows a block diagram of a preferred implementation of the present invention.

FIG. 1 illustrates by schematic block diagram the preferred implementation (100) for practicing the invention. The preferred implementation (100) combines an Event Decision-Maker (102) with associated Event Knowledge Database (104), an Alert Decision Requester (112), an Operator Console (114), an Alert Decision-Maker (116) and associated Alert Knowledge Database (118). The Alert Decision-Maker (116) allows the operator to manage the addressing alert in real time by using a structured model, methodically implemented. Further details about the arrangement of the Alert Decision-Maker (116) will be provided in FIG. 2.

Returning to FIG. 1, the Event Decision-Maker expert (102) manages, respectively, a DataCenter_1 (106) and a DataCenter_2 (108).

For the sake of simplicity, the system arrangement of the chosen example is reduced to a representation of two data centers with a minimum configuration. Those skilled in the art will readily understand that the arrangement of the present invention may operate identically whatever the size of the system configuration.

DataCenter_1 represents a system containing a cluster of Servers (110) linked together in a network. DataCenter_2 (108) communicates with an external network (external network) that represents, for example, a link for off sites backup, an internet access, a Business Partner access or equivalent networks. In the present invention, the DataCenter_1 (106) arrangement differs from the DataCenter_2 (108) arrangement to demonstrate the diversity of the application available in such a system environment. It is to be noted that a local Event Decision-Maker (102) and its associated Event Knowledge Database (104) can be also installed locally in each data center.

The Event Decision-Maker (102) receives an event signal from a data center (106/108) and makes a decision using the Event Knowledge Database (104). Then, the Event Decision-Maker launches actions by providing all the required system adjustments that any of the data centers needs to operate effectively. Similarly, the role of the Alert Decision-Maker (116) is to access the information concerning an alert, and use the Alert Knowledge Database (118) to interpret the information, make a decision, and launch an action. The Event Decision-Maker (102) can access the event information in systems or application logs, or can receive it in a specific data structure, such as, a Simple Network Management Protocol (SNMP).

Although the manner and protocols used to access that information may vary, they do not have an impact on the general approach. If the Event Decision-Maker (102) cannot automatically handle the event, it raises an alert. As explained in the background, the managing of an alert, unlike managing events, requires common sense for making the correct decision. Various elements make alert analysis difficult to carry out. Some of these elements are:
  the intrinsic nature of the data center (e.g. the nature of the services it provides and the application it runs);
  the geographic locations of the data center, that can indeed be dispersed;
  the existence of virtual or shared systems serving multiple customers as well as business applications made of several distributed components; and
  the need to take into account service level objectives or agreements that can vary over time.

Since the Event Decision-Maker (102) does not provide standard ways to manage addressing alerts, it initiates the Alert Decision Requester (112) that requests an operator intervention by displaying a message on the Operator Console (114). A skilled expert operator, well trained in the monitored data center, can recognize the addressing alert and directly recover it, via the operator console (114). This is done by applying the appropriate procedure, obtained from the Alert Operating Manual (120), to the Event Decision-Maker (102).

However, an operator that has limited experience in the world of data center management may activate the Alert Decision-Maker (116), using the operator console (114), without regard to Alert Operating Manual (120). Once activated, the Alert Decision-Maker (116) overrides the actions. The Alert Decision-Maker (116) discerns the patterns of the addressing alert and uses its own Alert Knowledge Database (118) to interpret the alert, by inferring operator-relevant information (like the required service level, the particular customer, the business application), and then automatically derives the actions needed to be applied.

It is to be noted that actions, such as, sending a message, a SMS, making a phone call, can be taken by the Alert Decision-Maker (116) itself. Alternately, such actions may be proposed to the operator via the operator console (114). The actions for the monitored environment can be a second level event to be interpreted by the Event Decision-Maker (102) or can be proposed directly to the Event Decision-Maker (102).

It is worth noting that the term "operator" is to be understood in a general sense: it can be for instance a system watcher, a help desk operator or a system administrator.

It is also worth noting that in an alternate embodiment, an alert raised in the Event Management System (Event Decision-Maker 102 and Event Knowledge Database 104 of FIG. 1) can be directed to the Alert Decision-Maker (116) directly and be displayed on the operator console for information.

Figure 2:
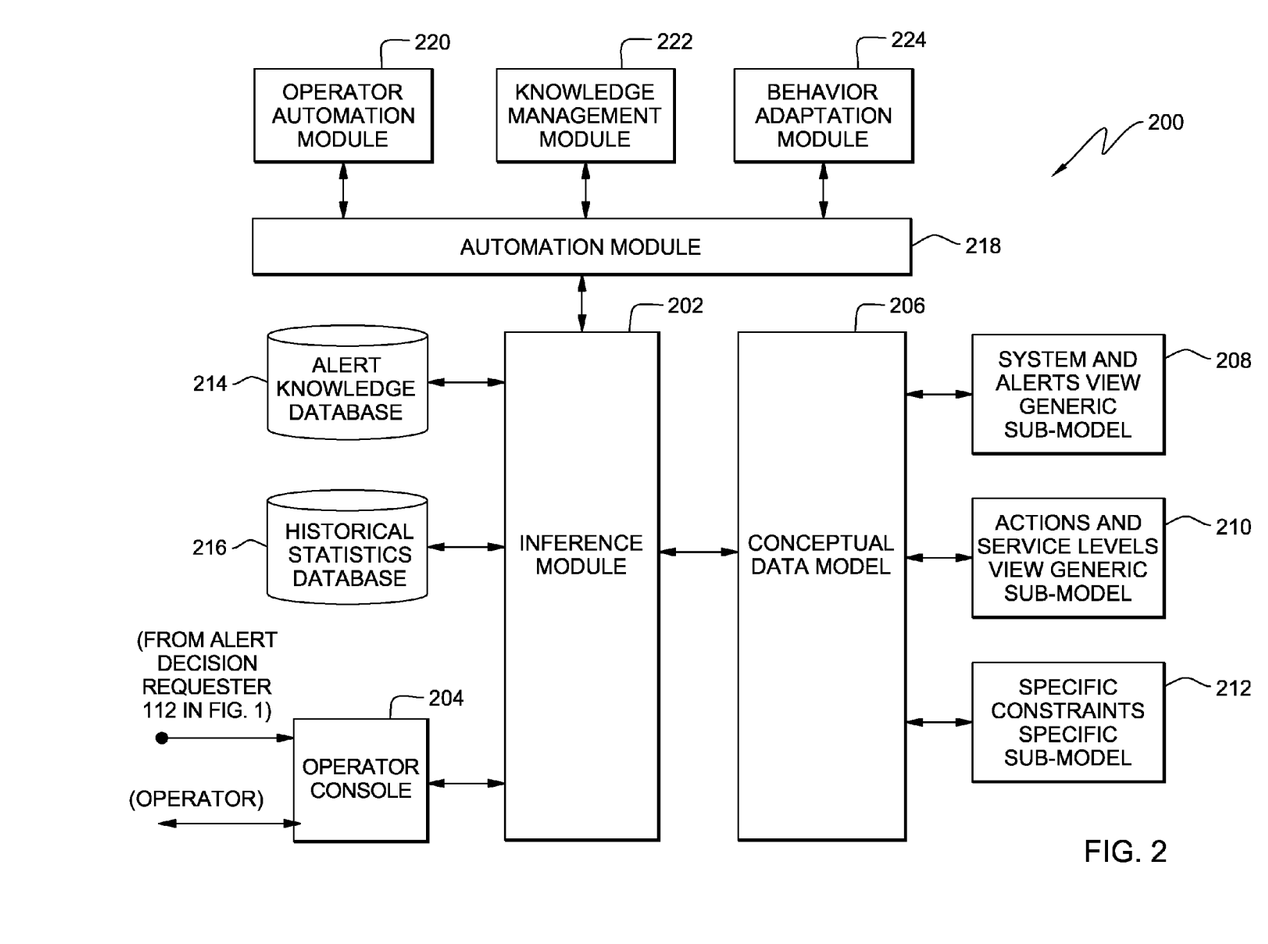
FIG. 2 illustrates the Alert Decision-Maker architecture for handling a stream of alerts within a system framework.

In regard to Alert Decision-Maker (116), there is shown in FIG. 2 a system framework for handling alerts, identified as Alert Decision-Maker System (200). The system comprises an Inference Module (202) interfacing with an operator Console (204), a Conceptual Data Model (206) of the monitored environment made of 3 sub-models (208, 210, 212), an Alert Knowledge Database (214), a database containing Historical Statistics Database (216) about the behavior of the monitored environment, an Automation Module (218) encapsulating modules that automate different levels of actions (illustrated by blocks 220, 222, 224).

The Inference Module (202) is a knowledge-based system that analyzes a stream of alerts, abstracts system-level alert messages and then transforms them into a set of actions that are submitted to the automation Module (218).

When processing an alert, the Inference Module (202) consults the Systems and Alerts View Generic Sub-Model (208) and the Actions and Service Levels View Generic Sub-Model (210) of the Conceptual Data Model (206) to determine what is considered an alert and a resolution action from the operator's perspective. It queries the Specific Constraints Specific Sub-Model (212) of the Conceptual Data Model (206) to construct a specialized knowledge of the environment being monitored. Then, in other steps, it generates information identifying the alert as an instance of said personalized model. It also generates contextual information relevant to the operator. Contextual information may include any of a variety of relevant information, such as, the computer network impacted by the alert, customer name, application name, time when alert occurred, etc. In a further step, the Inference Module (202) identifies the resolution actions to be triggered. These steps result in the creation of a data structure made of several fields representing the contextual information needed to identify the alert and its associated actions. This structure is an enriched representation of the alert, as perceived by the operator; its fields are filled by the Inference Module (202), using the Alert Knowledge Database (214), the Historical Statistics Database (216) or the input of the operator, as explained below.

Knowing what fields must be used to identify the alert and the resolution actions to be taken, the Inference Module (202) uses the rules stored in the Alert Knowledge Database (214) to infer the information that identify the alert; it uses both the Alert Knowledge Database (214) and the Historical Statistics Database (216) to infer the list of actions that must be taken. During this inference process, the Inference Module (202) interacts with the operator on the Operator Console (204) to request help when it cannot fully derive the information that identifies the arising alert or the associated actions. The interaction with the operator is implemented through a dynamic dialog initiated by the Inference Module (202), using the concepts described in the Conceptual Data Model (206). This dialog leads to the acquisition of new knowledge by the Inference Module (202), be it new inference rules or new specific constraints. This new knowledge is stored by the Inference Module (202), into the Specific Constraints Specific Sub-Model (212) for later reuse.

In the last step of its alert analysis, the Inference Module (202) submits to the Automation Module (218) the alert enriched with the inferred contextual and identifying information, and the list of identified actions.

The Operator Console (204) receives a stream of alerts from the Alert Decision Requester (not shown in FIG. 2). It also receives operator command orders for directly monitoring, controlling, and interacting with the Inference Module (202).

The Systems and Alerts View Generic Sub-Model (208) of the Conceptual Data Model (206) describes what is an alert in a Data Center, what are its attributes and what are the identifying key attributes. It also describes how the alert attributes are associated with the elements being monitored, i.e., the several component types (operating systems, database or transaction management systems, networks, and so on) managed in the Data Center and the concepts handled by the operator (application, customer, platforms, and so on). It provides a generic description of the information that must be found out by the Inference Module (202) to identify the alert from the operator's perspective.

The Actions and Service Levels View Generic Sub-Model (210) of the Conceptual Data Model (206) describes what are criteria that uniquely identify the actions which must be taken in answer to a well identified alert. It describes the actions that must be initiated to respond to the alerts, and how these actions can depend on the expected behavior of the monitored elements (operating systems, applications, etc.). Usually, the expected behavior is described in terms of service levels to be obtained for a system, an application, a customer (or any other concept relevant to the service management). Typically, service levels are defined for the percentage of availability of an application with different degrees, like critical or not critical, or bronze, silver, gold or platinum. The average response time of a critical transaction is another example of a service level, but one can define a plurality of other service types that those skilled in the art may readily recognize.

The service levels and the actions to be taken usually vary over time. Indeed, the expected level of service given (and consequently the operator's action) might not be the same during critical hours as that given outside critical hours. Critical hours can be either business hours or any specific critical period decided by the customer or by systems engineers. Such critical period could be, for instance, a year-end closure during which critical accountancy programs must run or a short period after the transfer of a new application release in production. The Actions and Service Levels View Generic Sub-Model (210) will therefore make the service levels dependent from a calendar of critical periods associated with the monitored resources.

The Actions and Service Levels View Generic Sub-Model (210) provides a generic description of the information that must be found out by the Inference Module (202) to identify the resolution actions from the operator's perspective.

Both the Systems and Alerts View Generic Sub-Model (208) and the Actions and Service Levels View Generic Sub-Model (210) are generic elements of the Conceptual Data Model. They provide a general description of the components of data centers, how arising alerts can be related to these components, how systems and applications behavior can be described in terms of expected service levels, how resolution actions can be dependent on the alerts, the components, and the systems or applications behavior. Having such generic models allows the implementation of an alert management system framework that is portable across different data centers. The generic data models are indeed usable in all data center environments. However, they might need some adaptations to take into account the possible specificities of the monitored environment; these specificities are to be described in the Specific Constraints Specific Sub-Model (212) part of the model. Such specific constraints can be for instance the fact that a concept or a relationship described in the generic models does not exist in the monitored environment. For instance, while the notion of geographic location is needed when managing multiple data centers, it is useless when managing a single data center located in a single site. While it is important to identify to which application (or customer) belongs every resource of a shared system, this is useless when the system is entirely dedicated to a given application (or customer). This kind of constraint can be translated by the assignment of a 'null' value to the attributes that describe a non-existent concept or relationship. Another kind of constraint could be the redefinition of the identification key of a concept. In such case, the constraint is translated into the redefinition of the key attributes of a concept and into the inference rule to provide values to these attributes. These two kinds of constraints are given for illustration purposes only; those skilled in the art of data modeling can easily see the kind of constraints that can be added to an existing data model.

The specific constraints can be inserted directly in the model when customizing the framework to the specific monitored environment, or more interestingly, they can be discovered by the Inference Module 202 during its alert analysis. When the Inference Module does not find an inference rule to infer one of the fields prescribed by the generic models, it asks the operator to describe how the information must be found or to provide directly the missing value. This results in the creation of a new inference rule or specific constraints refining its knowledge of the environment. The Inference Module (202) stores this new specialized knowledge in the Specific Constraints Specific Sub-Model (212). It must be noted that specific constraints can also disappear, and be automatically removed from the Specific Constraints Specific Sub-Model (212) by the Inference Module (202). Such would be the case, for instance, when a single-site data center becomes a dual-site center, making obsolete the constraint that the geographic location is not needed.

Moreover, the framework can run in learning mode. In this case, before any action, the Inference Module (202) systematically presents the operator with a step-by-step development of the reasoning (from the generic sub-models (208, 210), the Specific Constraints Specific Sub-Model (212) and the used inference rules (from 214) it has applied to complete the enriched information. The operator is asked for a validation of the proposed reasoning and, if needed, the reasoning is rectified and new knowledge is inserted into the Specific Constraints Specific Sub-Model (212).

The Inference Module (202) together with its ability to interact with the operator, and to interpret the generic sub-models (208, 210) and the Specific Constraints Specific Sub-Model (212), make the framework autonomous, self-adaptive, and portable across data centers. It is worth noting here that the framework uses operator concepts and is therefore also independent from (and portable on) any Event Management System that generates the alerts.

While the Conceptual Data Model describes "what" must be known by the framework to identify an alert and the corresponding actions, the Alert Knowledge Database (214) and the Historical Statistics Database (216) describes "how" the framework can infer this knowledge.

The Alert Knowledge Database (214) provides the Inference Module (202) with the rules explaining how to extract or derive from the original alert information, the elements that identify the alert; it also provides the target of agreed values of the service levels of any given monitored resource. Finally, it provides the rules to infer the action that must be taken, according to the criteria defined in the Actions and Service Levels View Generic Sub-Model (210).

The Historical Statistics Database (216) provides the Inference Module (202) with statistical facts about the behavior of the monitored elements (operating systems, applications, etc.). These statistics are related to the levels of service to be provided; they measure for instance the percentage of availability of a system over one month, the average response time of a specific transaction over one week, or the number of occurrences of a given alert type on a given application of a given customer during a given time period, and so on. These statistics can be updated offline by a batch job analyzing systems log, or online by the inference module when identifying the actions to be taken. The statistics are aggregated over the key attributes that identify the alerts. They are used by the Inference Module (202) to check whether the addressing alert is jeopardizing the service. When the Inference Module (202) has identified in the Alert Knowledge Database (214), the target values of the service levels defined on the resources impacted by the addressing alert, it checks in the Historical Statistics Database (216) whether the alert endangers that service level. If this is the case, it finds in the Alert Knowledge Database (214) what are the relevant actions to be taken.

The Historical Statistics Database (216) provides the possibility of controlling and adopting, preventively, the behavior of the systems or applications. It can be used, for instance, to implement a Statistical Process Control mechanism, tracking any deviation in the comportment of critical resources.

The Automation Module (218) might receive from the Inference Module (202) many actions or orders for one single alert. The module dispatches the orders to the appropriate modules; i.e., the Operator Automation Module (220) that will directly automate all actions towards the outside world, the Knowledge Management Module (222) that will evaluate the possible actions and provide advice to the operator and the Behavior Adaptation Module (224) that will automate actions towards the environment being monitored. These automation modules (220, 222 and 224) use enriched alert information (i.e. the data structure representing the alert and the contextual information, created and filled-in by the Inference Module) as input parameters, so that they can be modified, extended and reused across various applications.

The Operator Automation Module (220) receives from the Automation Module (212) the enriched alert information with the inferred contextual information that fully identifies the alert, and the execution orders for the outside world, like sending mail to a group of persons, or a SMS, or giving a call, or creating a problem ticket or any type of warning that one skilled in the art might consider appropriate.

The Knowledge Management Module (222) receives from the Automation Module (218) the alert, enriched with the inferred contextual information that fully identifies the alert. It classifies the alert according to this information and assigns to it a set of documented applicable resolution procedures classified according to the same criteria. These procedures are sorted by priority order and are presented as recommendations to the operator. This is one example of providing advice to the operator. Other possibilities exist for providing relevant advice, as those skilled in the art of Knowledge Management can easily imagine.

The Behavior Adaptation Module (224) receives from the Automation Module (218) the alert, enriched with the inferred contextual information that fully identifies the alert, and the execution orders to take preventive action that will avoid possible non-compliances with the expected service levels. The simplest action would be to inform an expert that the resources are not functioning correctly and to request an in-depth analysis. Another example of actions that could be taken would be to interact with the Event Management System, identified above in FIG. 1, and require it to correct the behavior of the systems or applications, e.g. by providing more memory or CPU resources to some specific components. The Event Management System has no access to the Inference Module of the Alert Decision-Maker and could not do the conceptual analysis that leads for instance to identification of a deviation in the behavior of a given application of a given customer.

Figure 3:
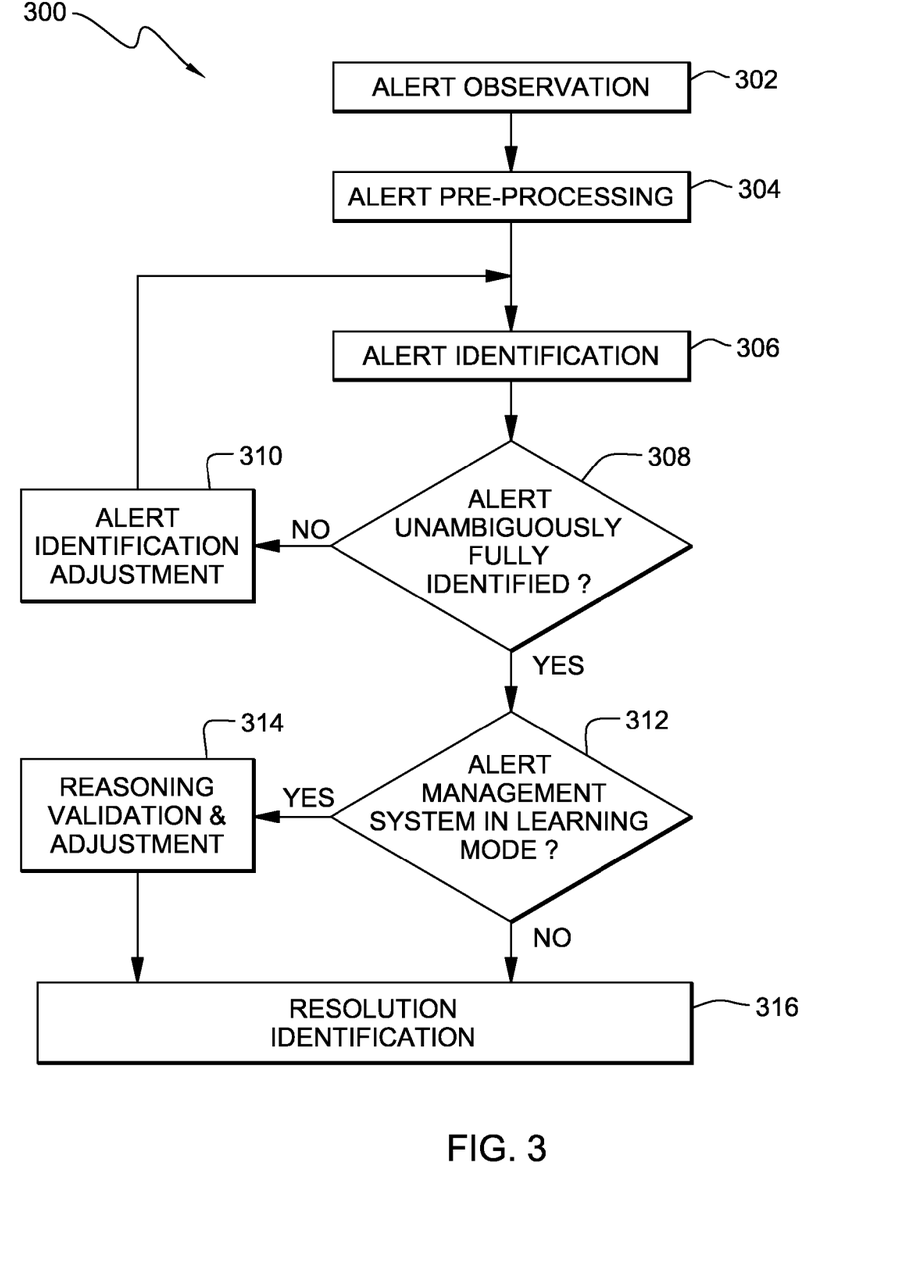
FIG. 3 is a flow chart of the Alert Decision-Maker process to initiate automatically an identification of an addressing alert in real time.

Going now to FIG. 3, a flow chart process (300) is shown representing the operation of the Alert Decision-Maker System (200) of the FIG. 2 when identifying an alert.

The Alert Decision-Maker System (200) of FIG. 2 receives alerts from the Alert Decision Requester (112), shown in FIG. 1. These alerts automatically initiate operator assistance in real time at Operator Console (204) in Alert Decision-Maker System (200).

The Operator Console (204) detects an addressing alert issued by the Alert Decision Requester in FIG. 1, to thereby initiate action by the Operator and/or Inference Module (202). The information contained in the addressing alert is adapted from the current format (imposed by the Event Management System) into a format compatible (Formatted Addressing Alert) for processing by the Inference Module (202), and is transmitted to the Inference Module (202) for identification and action. Then, the process of FIG. 3 goes from alert observation step 302 to step 304.

In step 304 (Alert Pre-processing) the Inference Module (202) of FIG. 2 queries the Conceptual Data Model (Generic Conceptual Data Model—all views) to find out which operator concepts are used to recognize an alert and the resolution actions, how these concepts are linked, and which attributes describe and identify them. The Inference Module (202) creates a data structure (Enriched Alert) which fields map the operator real-time representation of the alerts and the context in which they occur. Then, the process goes to step 306 in FIG. 3.

In step 306 (Alert Identification) of FIG. 3, the Inference Module (202) of FIG. 2 uses the inference rules stored in the Alert Knowledge Database (214) to derive the contextual information, or to extract it from the original message. Inference Module (202) uses this enriched information to fill-in the enriched alert structure (Enriched Alert). Then the process goes to step 308 in FIG. 3.

In step 308 (Alert Unambiguously Fully Identified), a status check is made to check that all fields of the enriched contextual information (Enriched Alert) required for identifying an alert are filled. If this is the case, the process goes to step 312 (branch Yes of the comparator (308). Otherwise, the process goes to step 310 (branch No of the comparator 308).

In step 310 (Alert identification Adjustment) of FIG. 3, the Inference Module (202) of FIG. 2 interacts with the operator at Operator Console (204) to ask how to derive the missing contextual information, or to request directly a value for this missing information. The Inference Module interprets the answer of the operator to complete the enriched alert (Enriched Alert) and to complete its knowledge of the monitored environment via Specific Constraints (212) of FIG. 2. Then, the process loops back to step 306 to check again the completeness of the enriched contextual information (Enriched Alert). To avoid an infinite loop, the Inference Module operates to take a default action (e.g. calling specialized support) when the operator cannot help in the information collection.

In step 312 (Alert Management System in Learning Mode) of FIG. 3, a status check is made to check the system mode. If the system is running in learning mode for acquiring specific knowledge about the data center being monitored, the process goes to step 314 (branch Yes of the comparator 312). Otherwise, the system stores the reasoning of the Inference Module into a log file for offline analysis and the process goes to step 316 (branch No of the comparator 312).

In step 314 (Reasoning Validation and Adjustment) of FIG. 3, the system is in learning mode. The Inference Module (202) of FIG. 2 interacts with the operator to display the contextual enriched information, explains how it was derived (detailing the concepts, constraints and inference rules used to infer the information), and asks for a validation or corrections to the applied rules or constraints. The Inference Module (202) stores the possible corrections introduced by the operator as new specific knowledge in the database of specific constraints of Specific Constraints (212) in FIG. 2. If corrections are introduced, Inference Module (202) updates the enriched information (Enriched Alert). Then the process goes to step 316 of FIG. 3.

In step 316 (Resolution identification), Inference Module (202) uses the addressing alert's identification to select, from the Alert Knowledge Database (214) of FIG. 2, a set of actions (List of Actions) that must be taken to handle the alert. It infers the direct actions (e.g. sending a mail to a specific expert, providing ranked recommendations to the operator), and the preventive actions to be taken in case of warning or alarm on the level of services. Inference Module (202) also checks in the Historical Statistics Database (216) as to whether the service is really in jeopardy before deciding to effectively select the preventive actions. Then the process goes to FIG. 4, step 402.

Figure 4:
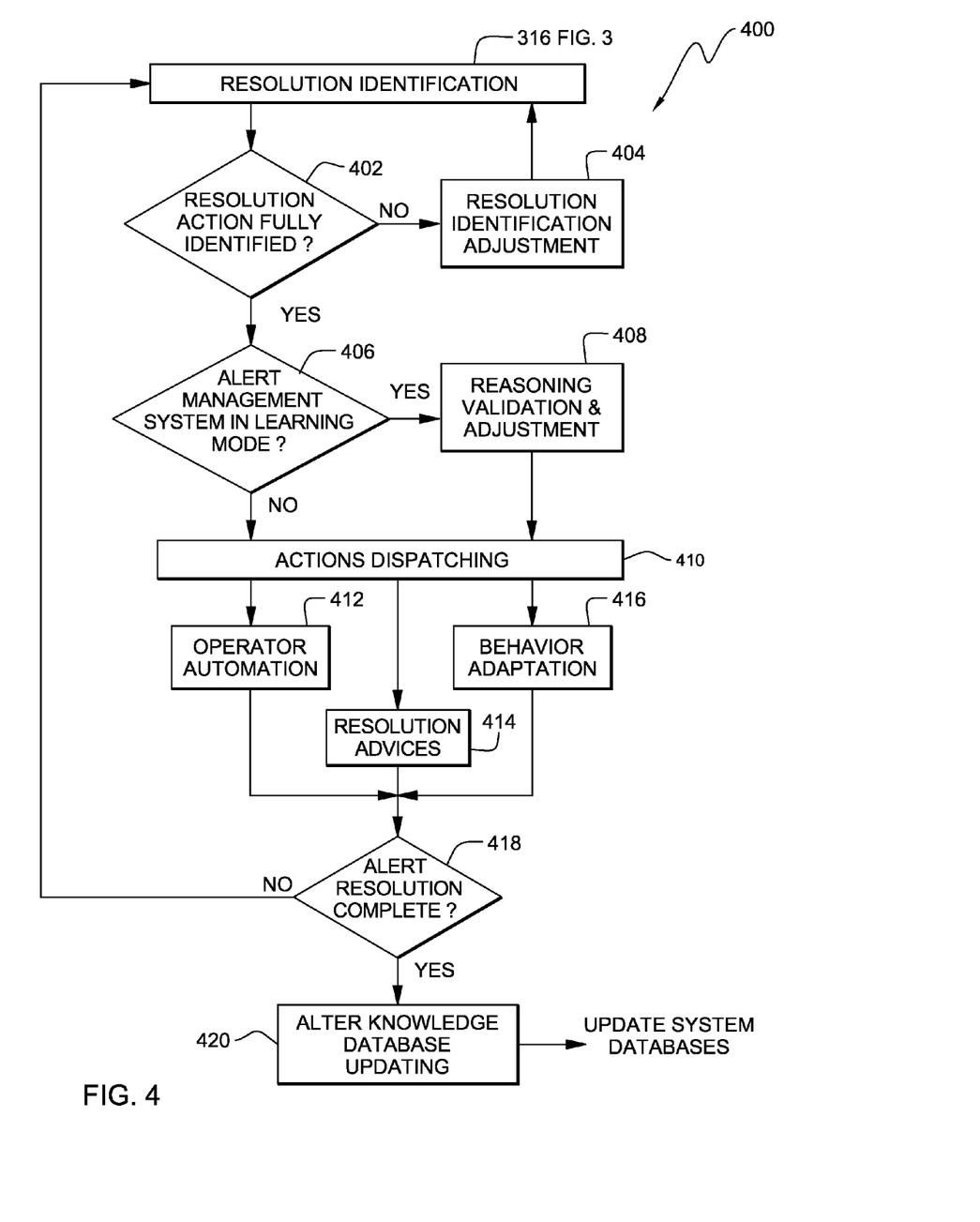
FIG. 4 is a flow chart of the Alert Decision-Maker process which acts to initiate adequate decision-making operator assistance and alert resolution corresponding to an identified addressing alert.

Going now to FIG. 4, a flow chart process (400) represents the Alert Decision-Maker (200) of the FIG. 2 when initiating decision-making operator assistance and an alert resolution corresponding to an identified addressing alert, as previously processed in FIG. 3.

The process of FIG. 4 starts from step 316 of FIG. 3, and goes to step 402 in FIG. 4. In step 402 (Resolution Action Fully Identified), a status check is made to check the integrity of the information provided by the Inference Module (202). If the information is not complete (for instance, contextual information missing or statistics data incomplete), the process goes to step 404 (branch No of the comparator 402). Otherwise, the process goes to step 406 (branch Yes of the comparator 402).

In step 404 (Resolution Identification Adjustment) of FIG. 4, Inference Module (202) interacts with the operator by asking for directives to derive the missing contextual information, to request directly a value for this missing information, or to directly describe which action must be taken. Then, Inference Module (202) receives operator feedback and upgrades both the enriched alert (Enriched Alert) and the knowledge of the monitored environment in Specific Constraints (212) in FIG. 2. The resolution actions must be redefined to take into account the newly upgraded contextual information and the process goes back to step 316. To avoid any undesirable infinite loop (via 402, 404, 316, 402), Inference Module (202) can decide to initiate a default action (e.g. calling specialized support) when the operator cannot help in the information collection (not shown here).

In step 406 (Alert Management System in Learning Mode) of FIG. 4, Inference Module (202) provides a complete list of actions (List of Actions). A status check is made to check the system mode. If the system is running in learning mode for acquiring specific knowledge about the data center being monitored, the process goes to step 408 (branch Yes of the comparator 406); otherwise the reasoning of Inference Module (202) is stored in a log file (not shown here) for offline analysis and the process goes to step 410 (branch No of the comparator 406).

In step 408 (Reasoning and Validation Adjustment), the system is in learning mode. In learning mode, Inference Module (202) of FIG. 2 interacts with the operator (Operator). It displays the contextual enriched information, explains how it was derived (detailing the concepts, constraints, inference rules and statistics used to infer the information), and requests an operator's validation or corrections accordingly. Then, the Inference Module stores the possible corrections brought by the operator as new specific knowledge into the database of specific constraints in Specific Constraints (212) in FIG. 2. In addition, it updates the list of actions (List of Actions) according to the corrections. After reasoning validation and adjustment, the process goes to step 410 in FIG. 4.

In step 410 (Actions Dispatching), the Automation Module (218) in FIG. 2 receives from Inference Module (202) the data structure containing the enriched contextual information (Enriched Alert) and a list of selected actions (List of Actions) that must be taken to handle the alert. The Automation Module (218) selects one or more of the modules (220, 222 and 224) of FIG. 2 to initiate the actions and transmits them the enriched information (Enriched Alert). Firstly, if Automation Module (218) selects the Operator Automation Module (220), then the process goes to step 412. Secondly, if Automation Module (218) selects the Knowledge Management Module (222), then the process goes to step 414. Finally, if Automation Module (218) selects the Behavior Adaptation Module (224), then the process goes to step 416.

In step 412 (Operator Automation) of FIG. 4, Operator Automation Module (220) of FIG. 2 receives the enriched contextual information (Enriched Alert) and the execution orders (Execution Orders) from Automation Module (218). It executes the given orders, interfacing with any relevant tool (for instance to send a SMS, create a problem ticket and so on). Then the process goes to step 418.

In step 414 (Resolution Advices), Knowledge Management Module (222) receives the enriched contextual information (Enriched Alert) and the execution orders (Execution Orders) from the Automation Module (218). It executes the given orders, providing the operator with relevant, ranked, documented resolution recommendations to handle the alert. Then the process goes to step 418.

In step 416 (Behavior Adaptation), Behavior Adaptation Module (224) receives the enriched contextual information (Enriched Alert) and the execution orders (Execution Orders) from the Automation Module (218). It executes the given orders, interfacing with any relevant tool (for instance to ask an in-depth analysis to an expert), possibly with the event Management System (for instance to request an action at the system level, or to simulate an event that will engender this action). Then the process goes to step 418 in FIG. 4.

In step 418 (Alert Completion Complete) of FIG. 4, a status check is made to check the completion of the alert resolution corresponding to the addressing alert. If the alert resolution is complete, the process goes to step 420 (branch Yes of the comparator 418). Otherwise, the process loops back to step 316 in FIG. 3 allowing the operator automation baselines of conceptual models to be updated in real time (branch No of the comparator 418).

In step 420 (Alert Knowledge Database Updating) of FIG. 4, once the Alert resolution is complete, the system commits the updates made during the process on:
- the specific constraints sub-model (i.e. the elements of the data model that describe the specificities of the environment being monitored);
- the content of the automation modules (220, 222 and 224 of FIG. 2);
- various parameters and attributes belonging to the current refined alert enriched framework sequence in the Alert Knowledge Database (214 in FIG. 2) and in the Historical Statistics Database (216 in FIG. 2) for future reuse.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. In a computer system network arrangement, a method for automating alert decision-making in managing network events, comprising the steps of:
   receiving an alert at an operator console in response to an event that cannot be handled by an event management system using an event knowledge database;
   creating a conceptual data model that defines an alert and its attributes and how the attributes are associated with the components of the network managed by the operator console to create a data structure with fields that map an operator console real time representation of the alert and the context in which it occurs which fields describe what must be known to identify the alert and a resolution action from the operator console view;
   with interaction from the operator console using an inference module having inference rules in a knowledge database and historical statistics database information related to the fields in the data structure of the conceptual data model to identify the alert and a list of actions to be taken at the operator console; and
   providing a status check to ensure all fields in the conceptual data model are complete.

2. The method for automating alert decision-making in managing network events as set forth in claim 1 comprising the further steps of:
   providing a status check that results in determining a field in the conceptual data model is not complete because an inference rule to derive information using the field could not be found;
   inquiring to the operator console as to where the source of such information may be found; and
   storing the operator response.

3. The method for automating alert decision-making in managing network events as set forth in claim 1, wherein said conceptual data model defines levels of service and specific constraints in its data structure.

4. The method for automating alert decision-making in managing network events as set forth in claim 3, comprising the further step of sending to the operator console before said actions are taken the conceptual data model and inference rules used to determine the list of actions to be taken for validation and any correction needed.

5. The method for automating alert decision-making in managing network events as set forth in claim 4, wherein said conceptual data model includes information in its data structure from the specific constraints data structure defining fields related to geographic location information for which no inference rule was found and said operator console acts to correct said geographic location information.

6. A computer program product to carry out alert decision-making by computer systems for managing computer system network events, said computer program product comprising:
   a non-transitory computer readable storage medium;
   a first program instruction for receiving an alert at an operator console in response to an event that cannot be handled by an event management system using an event knowledge database;
   a second program instruction for creating a conceptual data model that defines an alert and its attributes and how the attributes are associated with the components of the network managed by the operator console to create a data structure with fields that map an operator console real time representation of the alert and the context in which it occurs which fields describe what must be known to identify the alert and a resolution action from the operator console view;
   a third program instruction with interaction from the operator console for using an inference module having inference rules in a knowledge database and historical statistics database information related to the fields in the data structure of the conceptual data model that acts to identify the alert and a list of actions to be taken at the operator console;
   a fourth program instruction for providing a status check to ensure all fields in the conceptual data model are complete; and
   wherein said first, second, third and fourth program instructions are stored on said non-transitory computer readable storage medium.

7. The computer program product for alert decision-making in managing network events as set forth in claim 6 comprising the further program instructions on said non-transitory computer readable medium for:
  providing a status check that results in determining a field in the conceptual data model is not complete because an inference rule to derive information using the field could not be found;
  inquiring to the operator console as to where the source of such information may be found; and
  storing the operator response.

8. The computer program product for automating alert decision-making in managing network events as set forth in claim 6, wherein said conceptual data model defines levels of service and specific constraints in its data structure.

9. The computer program product for automating alert decision-making in managing network events as set forth in claim 8, comprising a further program instruction on said non-transitory computer readable storage medium for sending to the operator console before said actions are taken the conceptual data model and inference rules used to determine the list of actions to be taken for validation and any correction needed.

10. The computer program product for automating alert decision-making in managing network events as set forth in claim 9, wherein said conceptual data model includes information in its data structure from the specific constraints data structure defining fields related to geographic location information for which no inference rule was found and said operator console acts to correct said geographic location information.

11. A computer system for automating alert decision-making in response to alert decision requests from an event management system managing data centers in a network, comprising:
  an event management system connected to said data centers for monitoring and managing data center events and generating an alert signal for events that cannot be handled by using an event knowledge database of the event management system;
  a system operator console connected to said event management system;
  an input connection for receiving said alert decision request at said system operator console in response to an event that cannot be handled by said event management system;
  an alert decision-maker connected to said operator console including an inference module and a conceptual data model;
  said conceptual data model operating to define the alert and its attributes and how the attributes are associated with the components of the network managed by the operator console to create a data structure with fields that map an operator console real time representation of the alert and the contest in which it occurs which fields describe what must be known to identify the alert and a resolution action from the operator console view;
  said inference module connected to said conceptual data model and said operator console and having inference rules in a knowledge database and historical statistics database information related to the fields in the data structure of the conceptual data model that acts to identify the alert and a list of actions to be taken; and
  said alert decision-maker providing a status check to ensure all fields in the conceptual data model are complete.

12. The computer system for automating alert decision-making as set forth in claim 11 further comprising said alert decision-maker providing a status check that results in determining a field in the conceptual data model is not complete because an inference rule to derive information using the field could not be found and inquiring to the operator console as to how the information might be found.

13. The computer system for automating alert decision-making as set forth in claim 11, wherein said conceptual data model defines levels of service and specific constraints in its data structure.

14. The computer system for automating alert decision-making as set forth in claim 13, wherein said alert decision-maker sends to the operator console the list of actions to be taken for validation and any correction needed.

15. The computer system for automating alert decision-making events as set forth in claim 14, wherein said conceptual data model includes information in its data structure from the specific constraints data structure defining fields related to geographic location information for which no inference rule was found and said operator console acts to correct said geographic location information.

* * * * *